United States Patent [19]

Antony

[11] 4,217,176
[45] Aug. 12, 1980

[54] EVAPORATOR

[75] Inventor: Arthur P. Antony, Shorewood, Wis.

[73] Assignee: Aqua-Chem, Inc., Milwaukee, Wis.

[21] Appl. No.: 875,618

[22] Filed: Feb. 6, 1978

[51] Int. Cl.² .............................................. B01D 1/28
[52] U.S. Cl. .................................... 202/173; 202/197;
202/236; 202/264; 159/3; 159/5; 159/24 A;
159/47 WL; 159/DIG. 4; 203/10; 203/20;
203/26
[58] Field of Search ...................... 203/10, 11, 20, 26,
203/24, 22, 89, 90, 40, 71, 73; 202/172, 235,
264, 173, 236, 197, 182, 237, 205; 159/3, 5, 7, 24
A, 24 B, DIG. 4, 47 WL

[56] References Cited

U.S. PATENT DOCUMENTS

| | | | |
|---|---|---|---|
| 422,235 | 2/1890 | Lillie . | |
| 1,200,996 | 10/1916 | Soderlund et al. | 159/24 B |
| 1,461,640 | 7/1923 | Wirth-Frey | 203/26 |
| 2,368,665 | 2/1945 | Kohman et al. | 203/24 |
| 3,245,883 | 4/1966 | Loebel | 203/24 |
| 3,423,293 | 1/1969 | Holden | 203/26 |
| 3,444,049 | 5/1969 | Starmer et al. | 203/26 |
| 3,499,827 | 3/1970 | Cox | 202/173 |
| 3,868,308 | 2/1975 | Barak et al. | 202/174 |
| 3,957,588 | 5/1976 | Humiston | 203/26 |
| 4,082,616 | 4/1978 | Antony | 202/173 |

FOREIGN PATENT DOCUMENTS 326510 3/1930 United Kingdom .
1220373 1/1971 United Kingdom .

Primary Examiner—Wilbur L. Bascomb, Jr.

[57] ABSTRACT

A vapor compression distiller has a vertically oriented cylindrical tank and a heat exchanger having a plurality of groups of heat exchange tubes disposed one above the other. Internal baffling channels vapor through the groups of heat exchange tubes in a serial relation commencing with the vertically lowest group. Feed liquid is distributed from the upper end of the vessel downwardly over the surfaces of the tubes. This causes the evaporation of a first portion of the feed liquid and a condensation of the vapor. The evaporated and unevaporated portions of the feed liquid pass downwardly past the heat exchange tubes with the unevaporated portion collecting in a liquor well at the lower end of the vessel and the vapor passes upwardly along the sides of the vessel heat exchanger and outwardly to a compressor, the outlet of which is connected to the vapor inlet of the system. In a second embodiment, an additional evaporator is disposed below the first wherein the unevaporated feed liquid from the first evaporator is provided as the feed liquid of the second while the vapor withdrawn from and delivered to the second evaporator is connected in parallel with that of the first.

13 Claims, 5 Drawing Figures

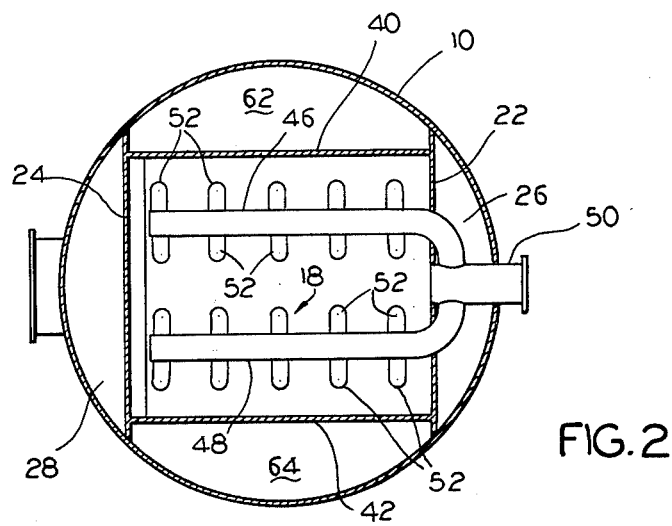
FIG. 2
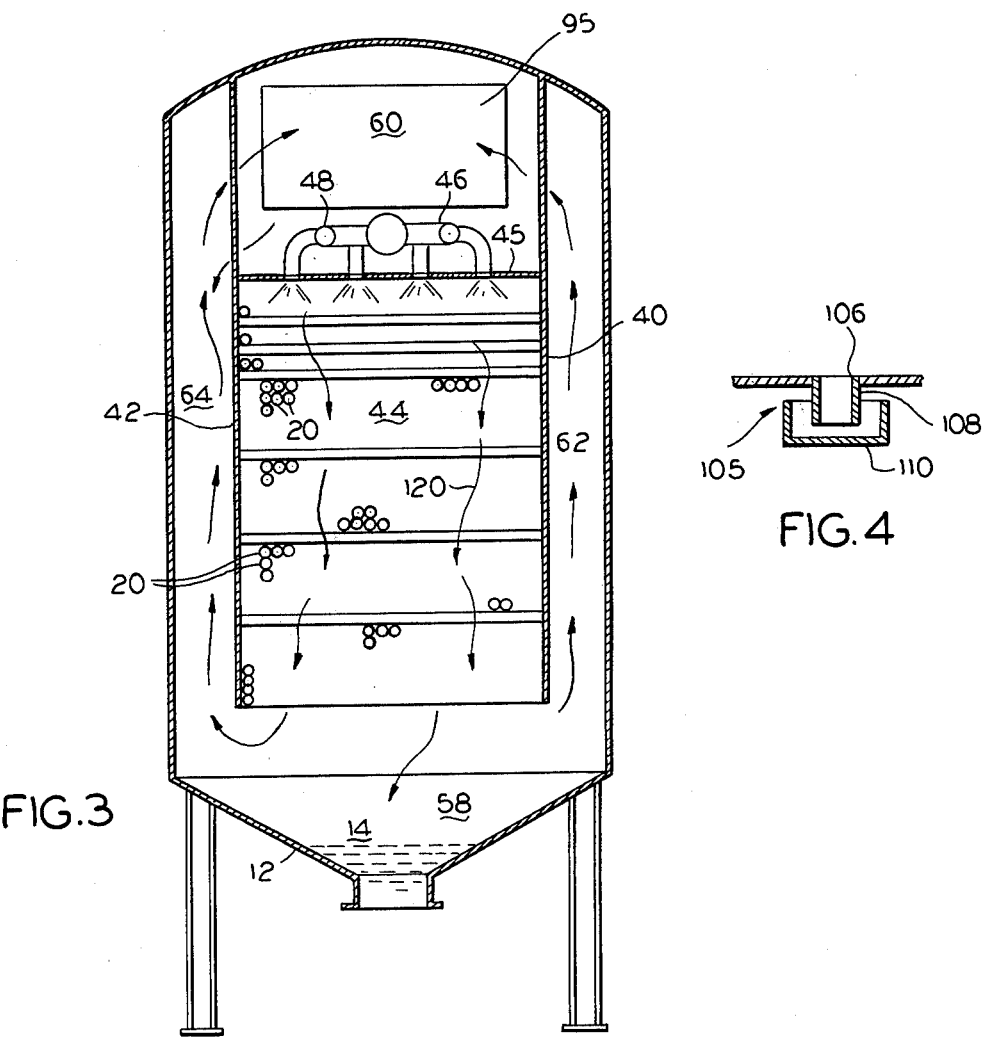
FIG. 3
FIG. 4

4,217,176

EVAPORATOR

BACKGROUND OF THE INVENTION

This invention relates to vapor compression distillers.

Vapor compression distillers generally include a heat exchange tube bundle and a feed liquid distributor for delivering feed liquid over the outer surfaces of the heat exchange tubes. A vapor is simultaneously delivered to the interior of the tubes and condenses as it gives up its heat of vaporization to the feed liquid. This causes a first portion of the feed liquid to evaporate and a second portion to collect in the lower end of the apparatus. The vaporized feed liquid is compressed and recirculated back to the inlet of the heat exchange tubes while fresh feed liquid is delivered to the system to compensate for evaporated liquid and concentrate which may be withdrawn.

Certain feed liquids such as kraft paper waste sulfate liquor, there is a tendency for the feed liquid to foam as it is distributed downwardly over the heat exchange tubes. System efficiency is substantially diminished if the foam is drawn into the compressor.

SUMMARY OF THE INVENTION

It is an object of the invention to provide a new and improved vapor compression distiller.

Another object of the invention is to provide a vapor compression distiller which is relatively compact without reducing the necessary heat exchange surface area.

Yet a further object of the invention is to provide a vapor compression distiller wherein feed liquids which tend to foam can be treated without substantial adverse effects.

These and other objects and advantages of the present invention will become more apparent from the detailed description thereof taken with the accompanying drawings.

BRIEF DESCRIPTION OF THE DRAWINGS

FIG. 2 is a view taken along lines 2—2 of FIG. 1;

FIG. 3 is a front elevational view of partly in section of the evaporator illustrated in FIG. 1;

FIG. 4 is an enlarged fragmentary view showing a portion of the evaporator illustrated in FIG. 1.

DETAILED DESCRIPTION OF THE PREFERRED EMBODIMENT

Figure 1:
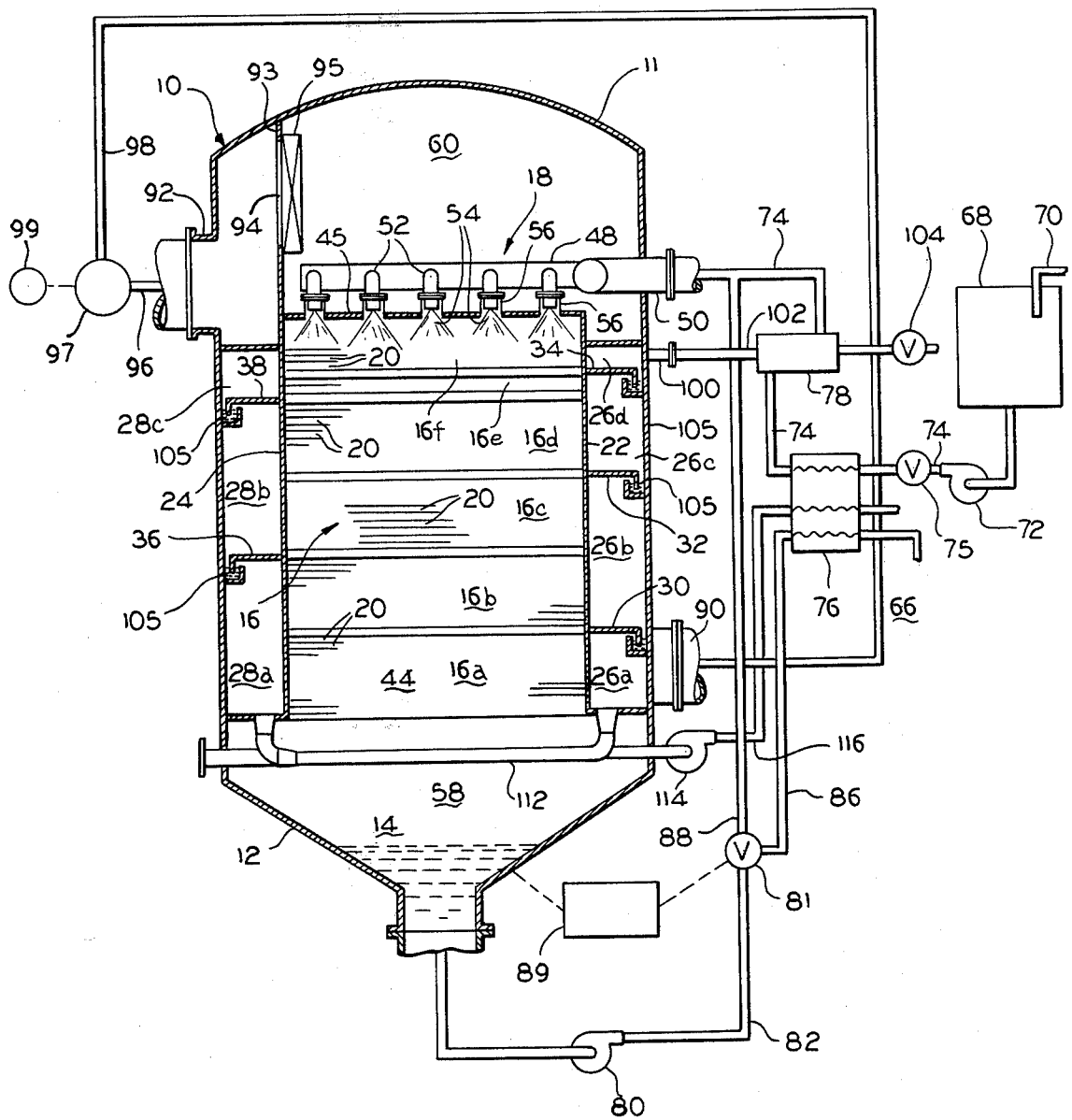
FIG. 1 is a side elevational view partly in section, schematically illustrating the preferred embodiment of the invention.

FIG. 1 schematically illustrates one embodiment of the evaporator 10 according to the present invention to include a hollow metallic shell 11 which is preferably elongate and generally cylindrical. The lower end of the shell 11 is suitably configured such as by means of the frusto-conical section 12, to define a liquor well 14. Intermediate the ends of the shell 11, and above the well 14, is a heat exchanger 16. Disposed above the heat exchanger 16 is a feed liquid distributor 18.

The heat exchanger 16 includes a plurality of generally horizontally extending tubes 20 the opposite ends of which are received in vertically extending, generally rectangular tube sheets 22 and 24, respectively. As seen in FIG. 2, the tube sheets 22 and 24 are generally parallel and spaced apart and intersect the walls of the shell 12 to define therewith vapor spaces 26 and 28. A first plurality of baffles 30, 32 and 34 extending horizontally between the tube sheet 22 and the wall of shell 11 divide the space 26 into compartments 26a, 26b, 26c and 26d, and the second plurality of baffles 36 and 38 extending horizontally between tube sheet 24 and shell 10 to divide space 28 into compartments 28a, 28b and 28c. A pair of partitions 40 and 42 extend vertically in parallel spaced apart relation along the sides of the heat exchanger 16 and between the tube sheets 22 and 24. A vapor generating space 44 is thus defined by tube sheets 22 and 24 and partitions 40 and 42.

The opposite ends of the heat exchange tubes 20 open into the vapor spaces 26 and 28 and their ends are sealed in their respective tube sheets 22 and 24 so that the vapor generating space 44 is separated from the vapor spaces 26 and 28. In addition, a rectangular top plate 45 is affixed to the upper ends of the tube sheets 22 and 24 and the partitions 40 and 42 to provide a barrier against the upward flow of vapor at the upper end of the vapor generating space 44. The lower end of space 44 is open, however.

The feed liquid distributor 18 includes a pair of manifold pipes 46 and 48 extending horizontally above the heat exchanger 16 and in a parallel spaced apart relation relative to each other. One end of each of the manifolds 46 and 48 is connected to a feed water inlet pipe 50 and a plurality of spray nozzles 52 are connected to each of the opposite sides of the manifolds 46 and 48 and extend generally downwardly therefrom and each is disposed in alignment with and vertically above corresponding openings 54 formed in the top plate 45. A plurality of sleeves 56 are affixed at their lower ends in a sealing relation relative to the peripheries of openings 54 and at their upper ends to the nozzles 52 so that each of the openings 54 in top plate 45 are effectively sealed. It will be appreciated, therefore, that there are a plurality of downwardly directed nozzles 52 distributed in a substantially uniform array above the upper end of the heat exchanger 16 for the distribution of feed liquid.

As seen in FIG. 1, the lower end of the heat exchanger 16 is disposed vertically above the brine well 14 to define a space 58. In addition, the top plate 45 is spaced vertically below the upper end of vessel 10 to provide a vapor collecting space 60. The partitions 40 and 42 are shown in FIGS. 2 and 3 to be spaced from the walls of shell 11 and are normal to and intersect each of the tube sheets 22 and 24. This defines a pair of vertically extending vapor passages 62 and 64 which extend between and connect the space 58 below heat exchanger 16 and the vapor collecting space 60 at the upper end of vessel 10.

A feed liquid supply system 66 is connected to the feed water inlet 50 and includes a tank 68 for containing feed liquid which may be supplied through conduit 70. The inlet of a circulation pump 72 is connected to the lower end of tank 68 and its discharge is connected by conduit 74 and valve 75 to inlet 50 either directly or through heat exchangers 76 and 78. Coupled to the liquor well 14 is the inlet of a recirculation pump 80 whose outlet is connected to a three-way valve 81 by a conduit 82. Valve 81 is of the type having a closed position, a first open position for connecting conduit 82 to a discharge conduit 86 and a second open position for connecting conduit 82 to a recirculation conduit 88 which is connected to feed liquid conduit 74. A concentrate control 89 may be connected to liquor well 14 and to valve 81 and may be operative to position valve 81 for connecting or disconnecting pipe 82 with respect to pipes 86 and 88. Valve 81 may also have a manual override so that it can be set regardless of the concentration in well 14.

A vapor inlet 90 is connected to the vessel 11 adjacent its lower end and opens into the compartment 26a. In addition, a vapor outlet 92 is connected to vessel 11 adjacent its upper end. Disposed between the outlet 92 and the vapor space 60 and extending upwardly from tube sheet 24 is a partition 93 having an opening 94 formed therein. A moisture separator or demister 95 is mounted over opening 94. Outlet 92 is connected by conduit 96 to the inlet of a vapor compressor 97 whose outlet is connected by conduit 98 to the inlet 90. Those skilled in the art will appreciate that the compressor 97 is operative to compress vapors generated in vessel 11 and for delivering the same to the vapor inlet 90. It will be appreciated also that any conventional compressor 97 may be employed such as a centrifugal compressor which is driven by any suitable engine or motor 99.

As seen in FIG. 1, the baffles 30, 32 and 34 extend generally horizontally from the tube sheet 22 to the wall of vessel 10 and are spaced apart vertically with the baffle 30 being lowermost and baffle 34 the uppermost. Baffles 36 and 38 also extend generally horizontally between tube sheet 24 and the wall of vessel 10 and are vertically spaced apart with baffle 36 being at an elevation substantially intermediate those of baffles 30 and 34 while baffle 38 is at an elevation between baffles 32 and 34. This provides six vapor passes through tubes 20. These vapor passes comprise 16a between compartments 26a and 28a, 16b between compartments 28a and 26b, 16c between compartments 26b and 28b, 16d between compartments 28b and 26c, 16e between compartments 26c and 28c and 16f between compartments 28c and 26d. A vent 100 is connected to compartment 26d and by a conduit 102 to heat exchanger 78 which acts as a vent condensor. A valve 104 connected to heat exchanger 78 may be selectively operable to couple vent condensor 78 to a vacuum source (not shown) whereby any uncondensed vapors exiting the heat exchange tubes 20 may be condensed in heat exchanger 78 and noncondensable gases withdrawn.

A trap 105 is provided in each of the baffles 30, 32, 34, 36 and 38 and adjacent the point where each engages the wall of vessel 11. One such trap is shown in greater detail in FIG. 4. Specifically an opening 106 is formed in each partition and a small half pipe 108 is connected at its accurate surface to the periphery of each opening 106 and extends downwardly therefrom into the compartment therebelow. In addition, the vertical edges of pipe 108 are affixed in a sealing relation to the inner surface of vessel 10. The open ends of half pipe 108 thereby provide a condensate flow passage between compartments. Disposed below the lower end of half pipe 108 is a half cup 110 which is substantially semicircular in plan view and is affixed at its open edge to the wall of vessel 11. The upper rim of cup 110 extends vertically above the lower end of path pipe 108 to provide a condensate trap thereby providing a vapor barrier between compartments. A condensate collecting pipe 112 connects the lower end of compartments 26a and 28a to the inlet of a condensate pump 114. The outlet of pump 114 is connected by conduit 116 to heat exchanger 76 before passage to a condensate collecting tank (not shown).

The feed liquid delivered to the apparatus illustrated in FIG. 1 may, for example, be the waste liquor from the production of kraft paper which typically contains sodium carbonate, sodium sulfate and various sugars and lignins.

Also, prior to delivery to the nozzles 52 the feed liquid would typically be heated to a temperature of approximately 230° F. If sufficient heat is not available in the heat exchangers 76 and 78, additional heat may be provided in a preheater 118.

The feed liquid received at the inlet 50 is delivered by manifold pipes 46 and 48 to spray nozzles 52 from which it is sprayed onto the outer surfaces of the heat exchange tubes 20 where it tends to form a thin film. Simultaneously heated vapor from compressor 96 passes through the interior of tubes 20. As a result of the temperature in the vessel 10 and of the feed liquid being sprayed from nozzles 52, a portion of the feed liquid vaporizes and flows downwardly into the vapor space 58 below the heat exchanger 16 as indicated by arrows 120. The unevaporated portion of the feed liquid also rains downwardly as indicated by arrows 122 and collects in the liquor well 14. As seen in FIG. 3, the vapor 120 passes below the lower edges of the partitions 40 and 42 and enters into vapor passages 62 and 64 where it is then free to flow upwardly to the vapor collecting chamber 60. From there, the steam flows through demister 95 where and entrained water droplets are removed and from outlet 92 into the compressor 97. The compressor 97 may, for example, raise the temperature of the vapor from the boiling temperature of the liquid being treated, which is approximately 230° F. to its saturation temperature. The compressed vapor is then delivered through conduit 98 to the inlet 90 and into the first steam compartment 26a. The vapor then flows serially through the groups of heat exchange tube bundes 16a, 16b, 16c, 16d, 16e and 16f. During its passage through the heat exchange tubes 20, substantially all of the vapor is condensed as it gives up its heat of vaporization for evaporating the liquid flowing as a thin film over the outer surfaces of tubes 20. The condensed vapor or condensate flows from the ends of the tubes 20, preferably the ends from which the vapor exits and into the compartments 26a, 26b, 26c, 26d, 28a, 28b and 28c. This condensate then flows downwardly through the trap 105 in the lower end of each compartment and to the compartment therebelow and from compartments 26a and 28a into pipe 112 for delivery by pump 114 to discharge conduit 116.

The system may be run on a continuous basis or in a batch mode depending upon the concentration of the feed liquid being delivered from tank 68 and the desired concentration of liquid to be discharged through pipe 86. When run in a continuous mode, the valve 81 is set to deliver concentrate to pipe 86 and valve 75 is set in an open position. Feed liquid will then continuously be delivered to distributor 18 and liquor withdrawn from well 14 and discharged through pipe 86. When operated in a batch mode, the concentrate control 89 will normally maintain the valve 81 in a position to connect conduits 82 and 88 so that the liquor is withdrawn from well 14 and delivered to distributor 18 until the desired concentration is achieved. At that point, the valve 18 is moved to an alternate position to connect pipe 82 to discharge pipe 86. Additional feed liquid is added to the system to compensate for evaporation and concentrate withdrawal by means of a float control 130 which is coupled to valve 75 for opening the latter when the level of liquid in well 14 falls to a predetermined height.

Figure 5:
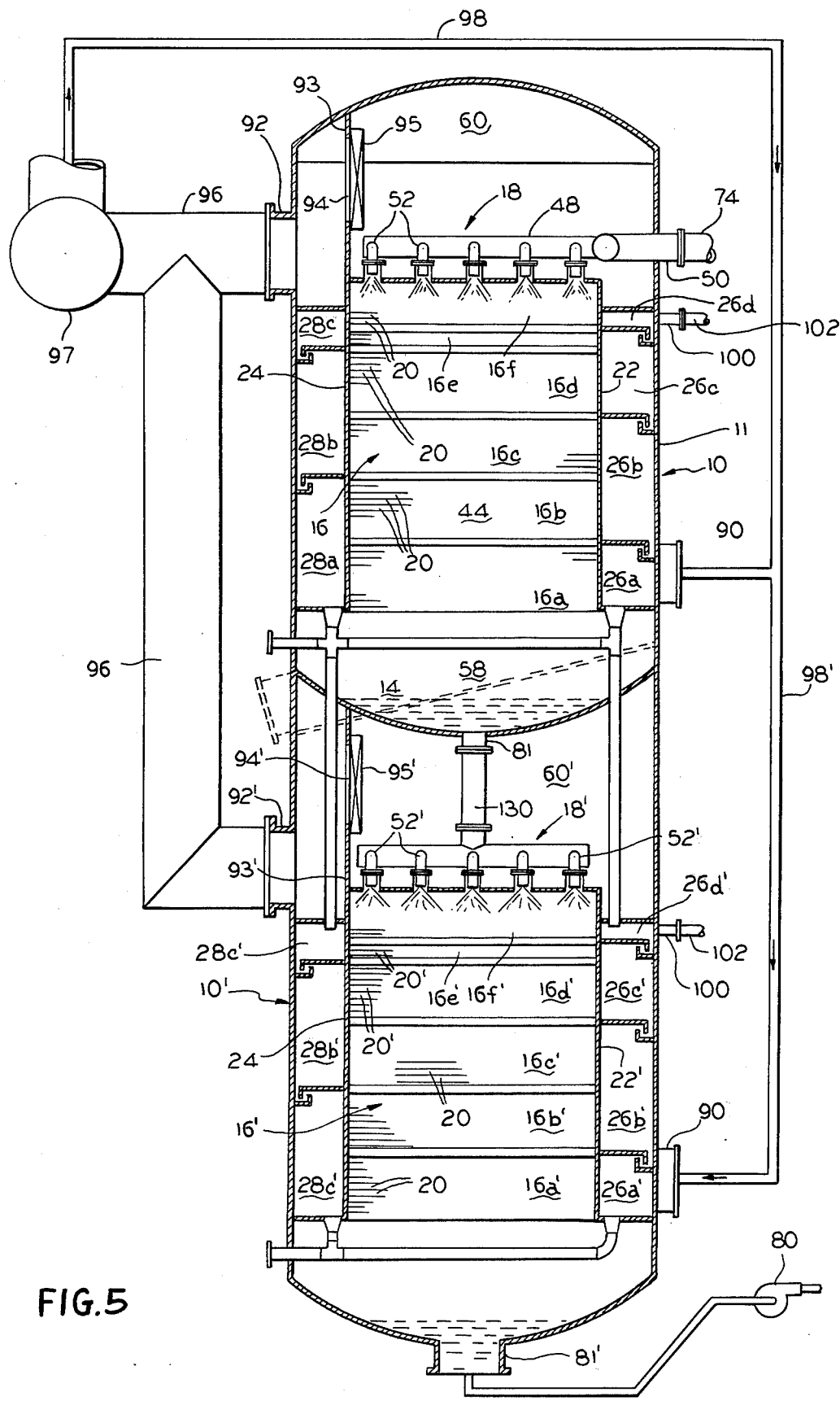
FIG. 5 is a side elevational view partly in section schematically illustrating an alternate embodiment of the present invention.

FIG. 5 shows an alternate embodiment of the invention which includes a first evaporator 10 which is substantially identical to the evaporator 10 illustrated in FIGS. 1-4 and a second evaporator 10' disposed therebelow. As indicated, evaporator 10 is substantially identical to evaporator 10 of FIG. 13 and, accordingly, corresponding portions have been identified with the same reference numerals. The second evaporator 10' is substantially identical to evaporator 10 and, accordingly, corresponding portions have been identified by the same reference numerals but are distinguished by a prime (').

The shell 11' of the lower evaporator 10' is generally cylindrical and is affixed in a concentric relation to the lower end of shell 11 and forms a continuation thereof to provide a unitary housing therewith. The drain 81 of evaporator 10 is connected to a vertically extending pipe 130 which is disposed in the vapor collecting chamber 60' and is connected to the inlet of the liquid distributor 18'. Accordingly, the liquid which is partially concentrated in the first evaporator 10 becomes the feed liquid for the second evaporator 10' and is distributed by the nozzles 52' downwardly over the tubes 20' of the heat exchanger 16' for partial evaporation as discussed above. The evaporated feed liquid in evaporator 10' flows upwardly along the sides of the heat exchanger 16' and into the vapor collecting chamber 60' and outwardly through the opening 97' and into the outlet 92'. Connected to outlet 92' is a second conduit 96' whose opposite end is connected into conduit 96. Accordingly, the vapor generated in both evaporators 10 and 10' are delivered to the inlet of the compressor 97. The outlet of compressor 94 is connected by pipes 98 and 98' to the vapor inlets 90 and 90' of evaporators 10 and 10', respectively. It can be seen, therefore, that, while the liquid distribution systems of evaporators 10 and 10' are connected in a series relation, the vapor systems are connected in parallel. The discharge conduit 81' of evaporator 10' may be connected to discharge pump 80 as indicated in FIG. 4.

The evaporators according to the present invention provide a system having a vessel which is substantially higher than its diameter to provide the desired heat exchange surface area with a sufficient elevation of the apertures 94 and 94' above the respective brine wells 14 and 14'. For example, in one form of the embodiment of FIG. 1, a vessel height to diameter ratio of about 3:1 may be provided. Accordingly, liquids having a strong tendency to foam can be treated without foam clogging the outlets 92 and 92'. Further, the evaporator 10 and 10' provide a unitary, relatively compact unit which can be arranged in relatively confined spaces.

While only two embodiments of the present invention have been shown and described, it is not intended to be limited thereby, but only by the scope of the appended claims. For example, while the heat source for the system is shown to be compressor 97, heated steam could be provided to inlet 90 from another source or the vapor exiting outlet 92 could be heated by other means.

I claim:

1. An evaporator including:

a generally vertically oriented vessel having a longitudinal axis, heat exchange means disposed within said vessel and intermediate the ends thereof and including a plurality of generally horizontally extending heat exchange tubes and a pair of tube sheet means arranged in spaced relation for supporting said heat exchange tubes, a plurality of partition means disposed adjacent said heat exchange tubes and engaging with said tube sheet means for defining an evaporating space, said heat exchange tubes extending through said evaporating space, said heat exchange means being spaced from the upper and lower ends of said vessel to define a first vapor collecting space in said vessel above said heat exchange means and a second vapor collecting space in said vessel below said heat exchange means, said tube sheet means and said partition means being spaced from said vessel and defining therewith a plurality of continuous and spaced apart vapor passages extending generally vertically, the opposite ends of said heat exchange tubes extending between first and second ones of said passages and at least one additional vapor passage extending between and interconnecting said vapor spaces, said partition means isolating said first and second passages from said vapor spaces, a plurality of baffles disposed in each of said first and second passages, the baffles in each passage being arranged in a vertically staggered relation one to the other and at different elevations than those of the other whereby the heat exchange tubes are divided into groups with the inlet and outlet ends of the tubes of adjacent groups isolated so that the vapor is routed back and forth through adjacent groups of said heat exchange tubes, cover means disposed above said evaporating space for separating the same from said first vapor collecting space, a feed liquid distributor disposed above said heat exchange means for distributing feed liquid downwardly over said heat exchange tubes, a vapor inlet connected to one of said first and second passages and a vapor outlet connected to said first vapor collecting space.

2. The evaporator set forth in claim 1 wherein said vessel is curvate in horizontal cross-section, said first partition means comprising a pair of vertically oriented partitions, said partitions and said tube sheet means being arranged in a generally rectangular array to define said evaporating space, the space between said tube sheet means and said vessel defining said first and second passages and the space between said vessel and said partitions defining third and fourth passages extendng between said first and second vapor collecting spaces.

3. The evaporator set forth in claim 1 and including vapor compression means having an inlet connected to said first vapor collecting space through said vapor outlet and an outlet connected to the first of said passages and at the lower end thereof.

4. The evaporator set forth in claim 1 and including trap means disposed in each of said baffle means to permit the flow of condensate downwardly through said first and second vapor passages without venting one to the other.

5. The evaporator set forth in claim 1 wherein said vessel is substantially cylindrical with its height being substantially greater than its diameter.

6. The combination set forth in claim 1 and including an evaporating assembly disposed below said evaporator and being substantially identical thereto, said evaporator also including an enclosure attached in an endwise relation below the lower end of said vessel and liquid distributing means, a liquid collector disposed below the second evaporating space of said evaporator and means connecting said liquid collector to the liquid distributing means of said evaporating assembly.

7. The evaporator set forth in claim 6 and including vapor compression means having an inlet connected to said first vapor collecting space and an outlet connected in a parallel relation to the first of the passages of each of said evaporator and said evaporating assembly and at the lower ends thereof.

8. An evaporator including:
- a generally vertically oriented vessel having a longitudinal axis,
- a heat exchanger including an enclosure and a plurality of heat exchange tubes, said enclosure being disposed within said vessel and intermediate the ends thereof and being closed at its upper end by a cover and at its lateral sides by side walls, and having a bottom opening to define a vaporizing space, said heat exchange tubes extending generally horizontally across said vaporizing space and being arranged in vertically arranged groups,
- said heat exchanger being spaced from the upper and lower ends of said vessel to define a first vapor collecting space in said vessel above said heat exchanger and a second vapor collecting space in said vessel below said heat exchanger,
- the side walls of said enclosure defining with said vessel a plurality of spaced apart vapor passages between said enclosure and said vessel and extending generally vertically, the opposite ends of said heat exchange tubes extending between first and second ones of said side walls and opening into the first and second ones of said passages,
- partition means isolating said first and second passages from said vapor spaces, the other side walls of said enclosure defining at least one additional vapor passage extending between and communicating said vapor spaces,
- spray means disposed below said cover and above said heat exchange tubes for distributing feed liquid downwardly over said heat exchange tubes,
- a plurality of baffles disposed in each of said first and second passages, the baffles in each passage being arranged in a vertically staggered relation relative to each other and at different elevations than those of the other whereby vapor passing through said tubes is drected serially through said groups of heat exchange tubes and from one of said first and second passages to the other,
- and a vapor inlet connected to one of said first and second passages and a vapor outlet connected to said first vapor collecting space.

9. The evaporator set forth in claim 8 and including vapor compression means having an inlet connected to said vapor collecting space and an outlet connected to the first passage and at the lower end thereof.

10. The evaporator set forth in claim 8 and including trap means disposed in each of said baffles to permit the flow of condensate downwardly through said first and second flow passages without venting one to the other.

11. The evaporator set forth in claim 8 wherein said vessel is substantially cylindrical with its height being substantially greater than its diameter.

12. The combination set forth in claim 8 and including an evaporating assembly disposed below said evaporator and being substantially identical thereto, said evaporating assembly including an enclosure attached in an endwise relation below the lower ends of said vessel and liquid distributing means, a liquid collector disposed below the second evaporating space of said evaporator and means connecting said liquid collector to the liquid distributing means of said evaporating assembly.

13. The evaporator set forth in claim 12 and including vapor compression means having an inlet connected to said first vapor collecting space of said evaporator and of said evaporating assembly and an outlet connected to the first of said passages of each and at the lower end thereof.

* * * * *

UNITED STATES PATENT AND TRADEMARK OFFICE
CERTIFICATE OF CORRECTION

PATENT NO. : 4,217,176
DATED : August 12, 1980
INVENTOR(S) : Arthur P. Antony

It is certified that error appears in the above-identified patent and that said Letters Patent are hereby corrected as shown below:

Claim 3, Column 6, line 57, after "lower" cancel "end" and substitute --ends--.

Claim 8, Column 8, line 9, cancel "drected" and substitute --directed--.

Signed and Sealed this

Eleventh Day of November 1980

[SEAL]

Attest:

SIDNEY A. DIAMOND

Attesting Officer

Commissioner of Patents and Trademar